United States Patent
Nakahara

[11] Patent Number: 5,911,475
[45] Date of Patent: Jun. 15, 1999

[54] SADDLE COVER FOR MALE RACING CYCLIST

[76] Inventor: Toshikazu Nakahara, 4-8-25 Aotani-cho, Nada-ku, Kobe, Japan, 657

[21] Appl. No.: 09/094,419

[22] Filed: Jun. 9, 1998

[51] Int. Cl.⁶ .................. B62J 1/00; B62J 1/18
[52] U.S. Cl. ............. 297/219.11; 297/214; 297/202
[58] Field of Search .................. 297/219.11, 200, 297/202, 214, 195.1

[56] References Cited

U.S. PATENT DOCUMENTS

| | | | |
|---|---|---|---|
| 576,969 | 2/1897 | Hunt | 297/214 |
| 594,451 | 11/1897 | Wheeler | 297/202 |
| 1,858,477 | 5/1932 | Blake | 297/202 |
| 3,997,214 | 12/1976 | Jacobs | 297/214 |
| 4,451,083 | 5/1984 | Marchello . | |
| 4,842,332 | 6/1989 | Conner, Jr. et al. . | |
| 5,203,607 | 4/1993 | Landi . | |
| 5,720,518 | 2/1998 | Harrison | 297/214 |

FOREIGN PATENT DOCUMENTS

WO 94/08839  4/1994  WIPO .................. 297/219.11

*Primary Examiner*—Peter M. Cuomo
*Assistant Examiner*—Anthony D. Barfield

[57] ABSTRACT

A saddle cover for a racing cyclist, especially for the male cyclist racing in the aerotuck position where the male organ is pinched awkwardly against the bicycle seat or saddle. The saddle cover includes a pair of front elongate relatively raised resilient cushion portions on a front portion of the saddle, running forwardly and rearwardly and being spaced transversely of each other such that the male organ is cradled on and between the elongate resilient cushions. The saddle cover further includes a pair of rear generally elliptical relatively raised resilient cushion portions on a rear portion of the saddle for the bony portions of the buttocks. The front pair of cushions is spaced from the rear pair of cushions such that the space therebetween is relatively depressed. The saddle cover is resiliently stretchable over a conventional saddle. Further, if desired, the cover may be integral with the saddle.

17 Claims, 6 Drawing Sheets

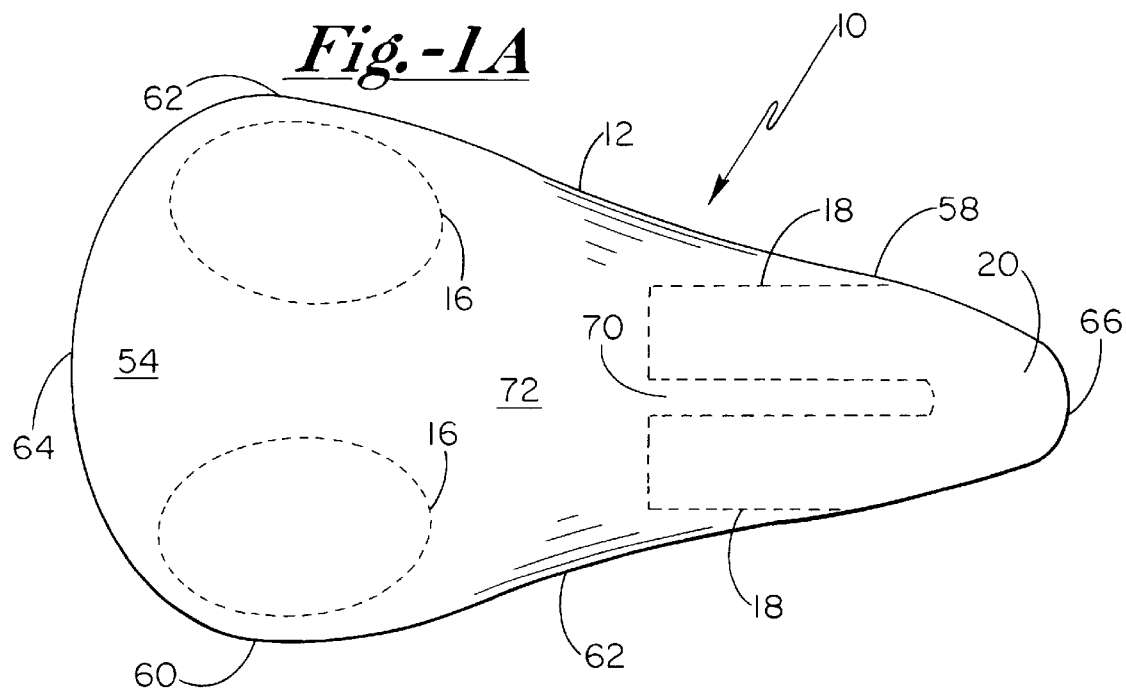
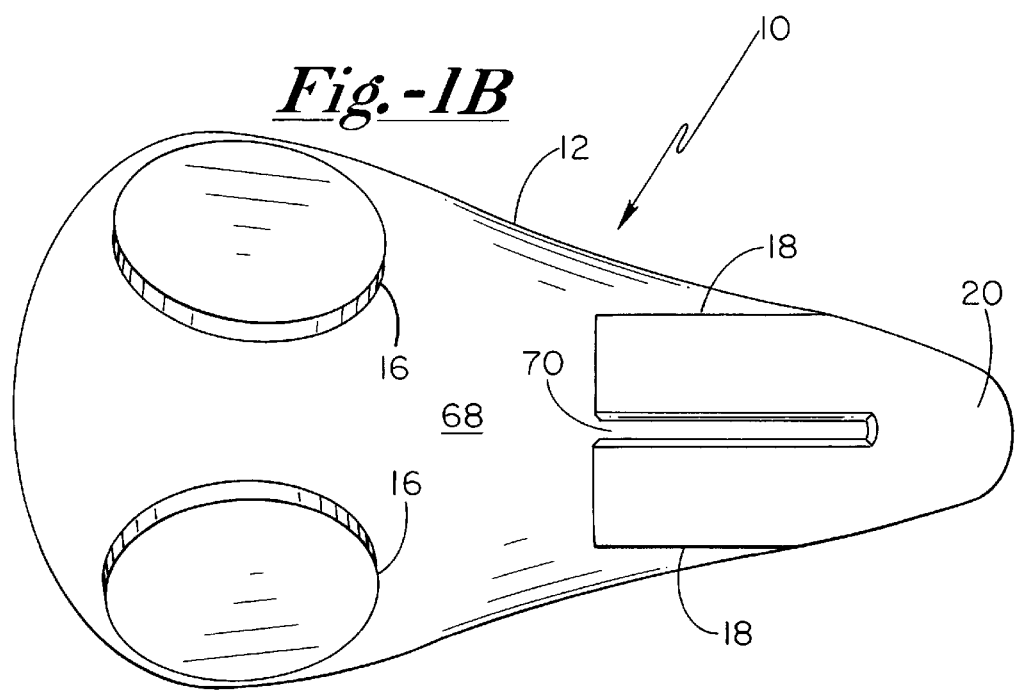

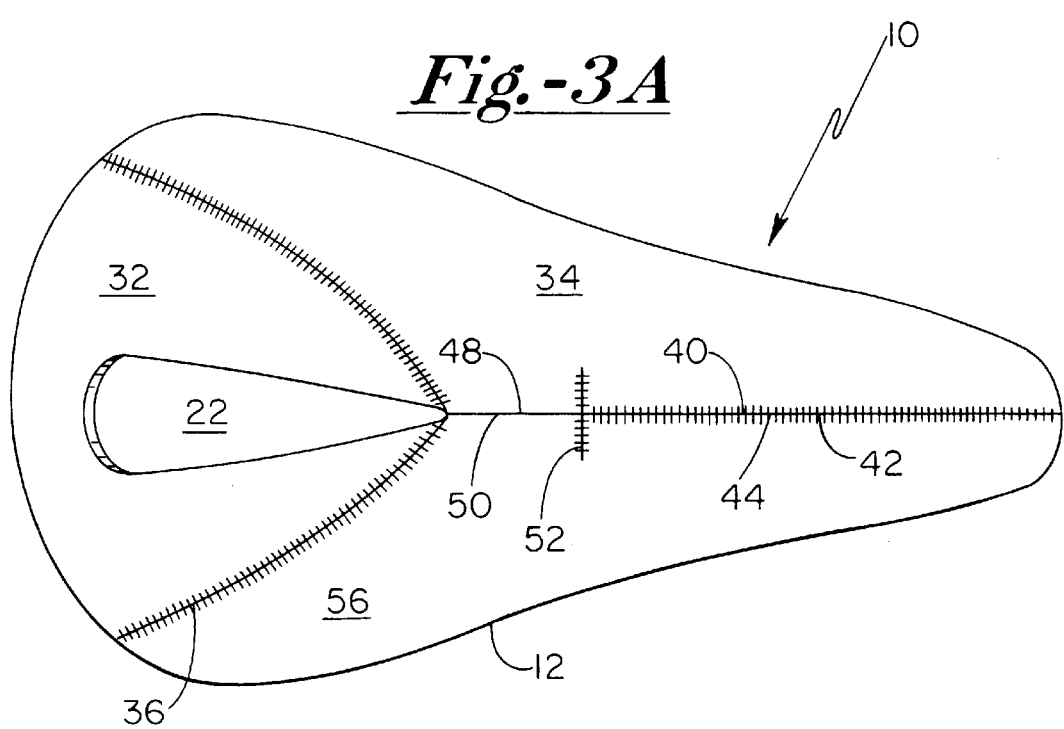
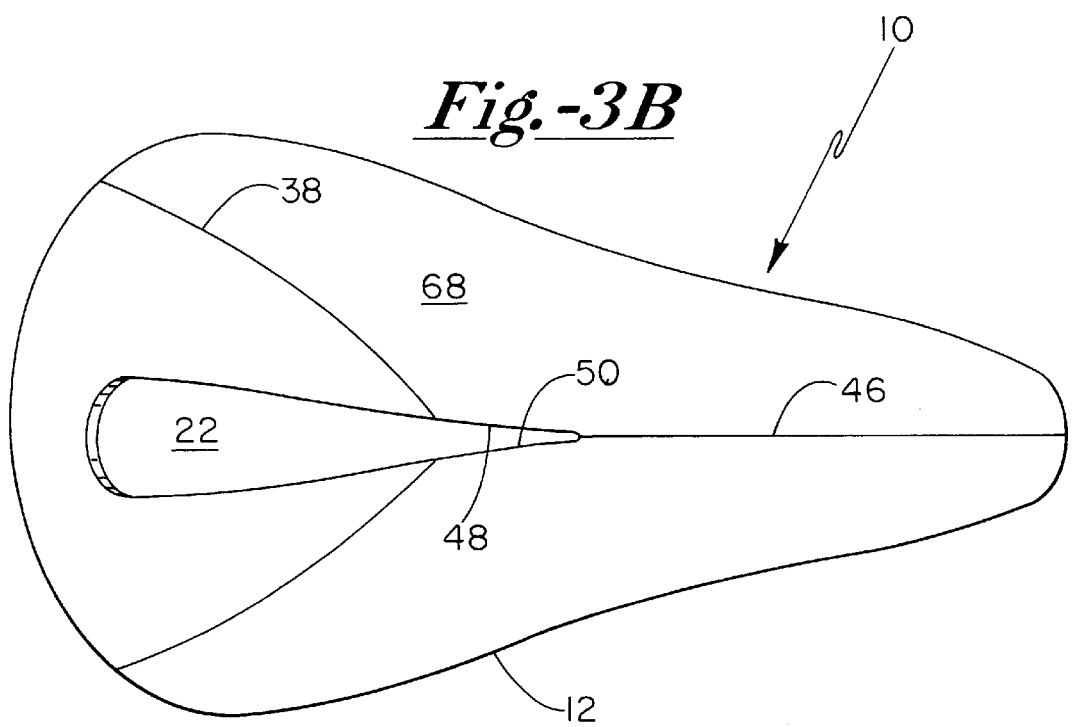

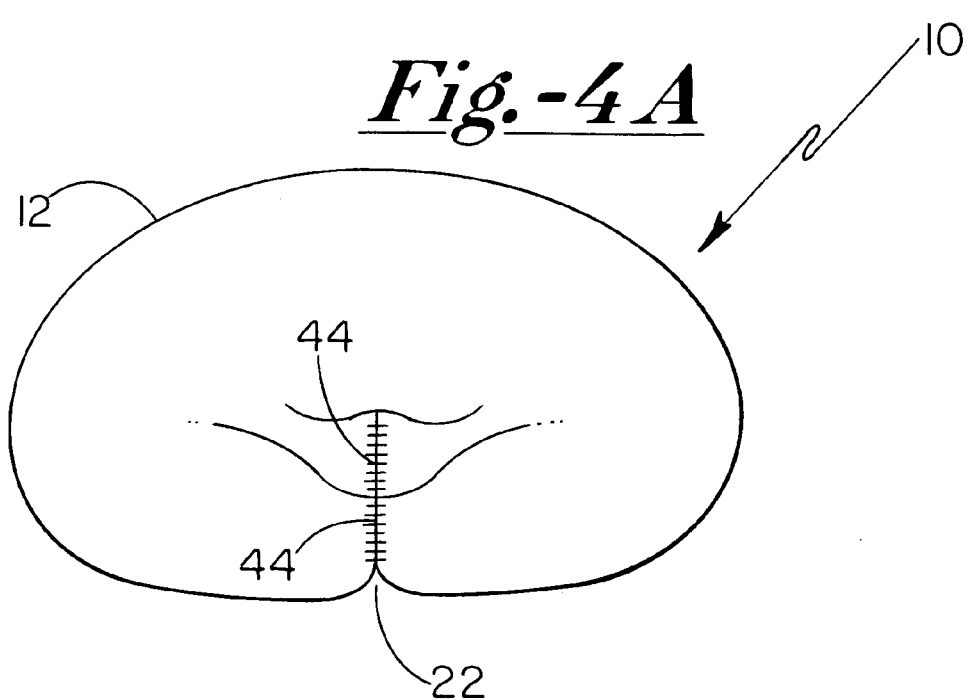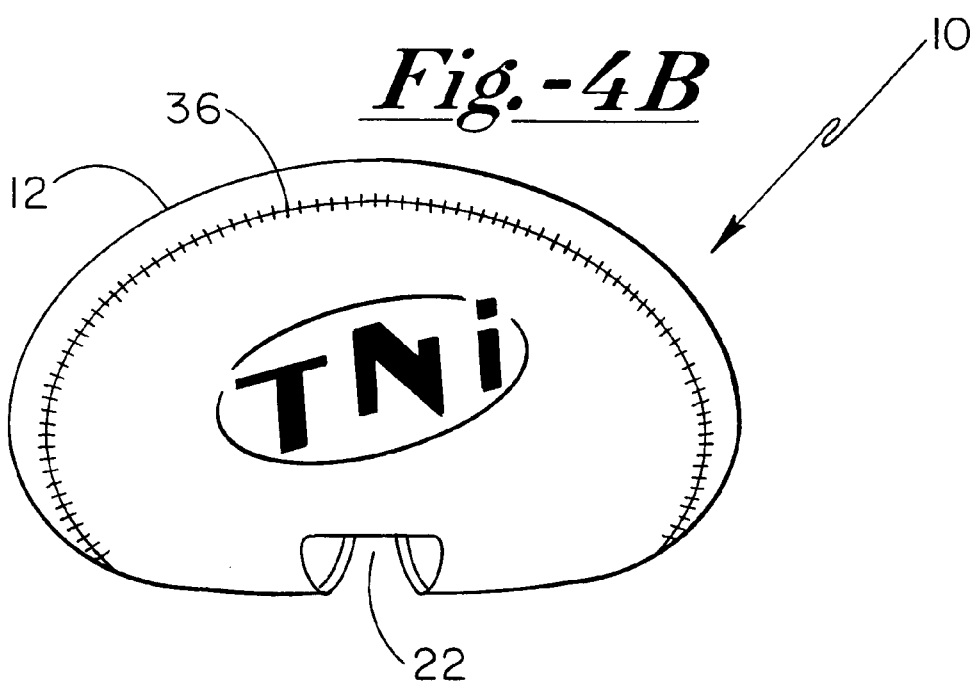

5,911,475

SADDLE COVER FOR MALE RACING CYCLIST

BACKGROUND OF THE INVENTION

The present invention relates generally to bicycle seats or saddles, particularly to bicycle seats or saddles for males, and specifically to bicycle seats or saddles for males when racing in the aerotuck position.

The aerotuck position is uncomfortable for the male racing bicyclist. In such a position, the rider leans forward, arms extended, chest down, and the male organ is pinched against the seat or off to one side. Time adds to the discomfort and, because of the nature of the sport, most bicycle races are rather long.

SUMMARY OF THE INVENTION

A general object of the present invention is to provide a unique bicycle saddle for the male cyclist.

Another object of the present invention is to provide a unique front portion for a bicycle saddle. The front portion includes a pair of front elongate resilient cushions. The cushions run frontwardly and rearwardly and are spaced from each other such that the male organ may be cradled on and between the elongate cushions as the male cyclist leans forwardly to place himself in the aerotuck position.

Another object of the present invention is to provide a unique rear portion for a bicycle saddle. The rear portion includes a pair of rear generally elliptical resilient cushions for the bony portion of the buttocks.

Another object of the present invention is to uniquely provide such front and rear portions on a resiliently removable saddle cover.

Another object of the present invention is to uniquely provide a tough skin to the saddle cover combined with resilient cushioning immediately below the skin.

Another object of the present invention is to provide a saddle cover for a male rider that has the appearance of a conventional saddle cover or the appearance of a conventional saddle. The relatively raised resilient cushions for the male organ and bony portions of the buttocks are inside of the envelope and are minimally noticeable when the saddle cover is on the saddle.

An advantage of the present invention is speed. With his male organ in a comfortable position, a cyclist is able to drive his legs at a greater rate with more power. Further, instead of coming out of the aerotuck position repeatedly to adjust the position of his male organ like a baseball player, the male cyclist stays down in the aerotuck position, minimizing wind resistance.

Another advantage is comfort. The male organ is cradled comfortably on and between cushions, instead of being pinched. The pressure points of the buttocks—the bony portions—are cushioned.

Another advantage is that the saddle cover may be used on a conventional saddle. The conventional saddle is customized for a male rider.

Another advantage is that the saddle cover is simple and inexpensive to manufacture.

These and further objects and advantages of the present invention will become clearer in light of the following detailed description of the illustrative embodiments of this invention described in connection with the drawings.

BRIEF DESCRIPTION OF THE DRAWINGS

The illustrative embodiments may be best described by reference to the accompanying drawings where:

FIG. 1A is top, partially phantom view of the saddle cover of the present invention.

FIG. 1B is top view of the saddle cover of FIG. 1A turned inside out.

FIG. 3A is a bottom view of the saddle cover of FIG. 1A.

FIG. 3B is a bottom view of the saddle cover of FIG. 1A turned inside out.

FIG. 4A is a front view of the saddle cover of FIG. 1A.

FIG. 4B is a rear view of the saddle cover of FIG. 1A.

Figure 2A:
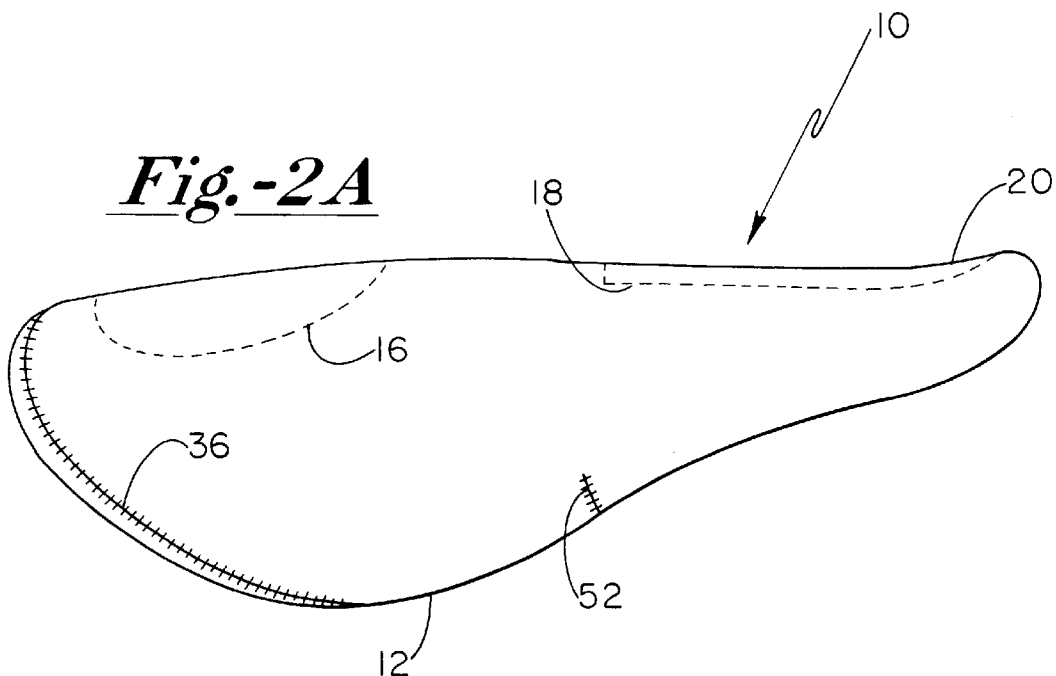
FIG. 2A is a side, partially phantom view of the saddle cover of FIG. 1A.
Figure 2B:
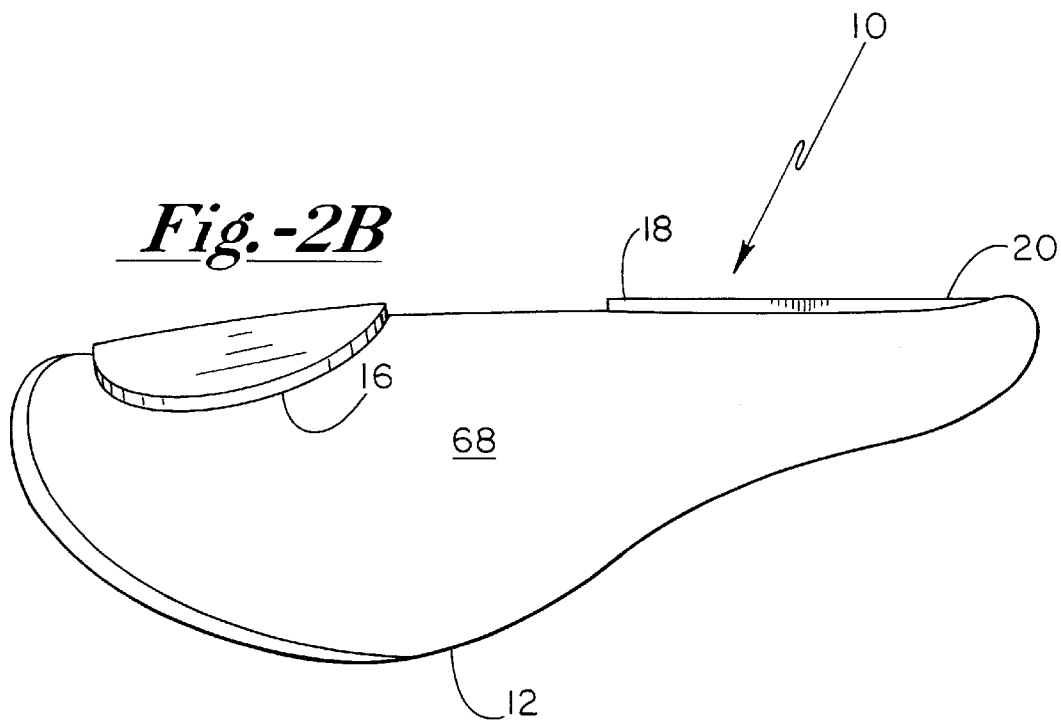
FIG. 2B is a side view of the saddle cover of FIG. 1A turned inside out.

All Figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "inner", and "outer", and similar terms are used herein, it should be understood that these terms have reference only to the structure shown in the drawings as it would appear to a person viewing the drawings and are utilized only to facilitate describing the preferred embodiments.

DESCRIPTION

Figure 5A:
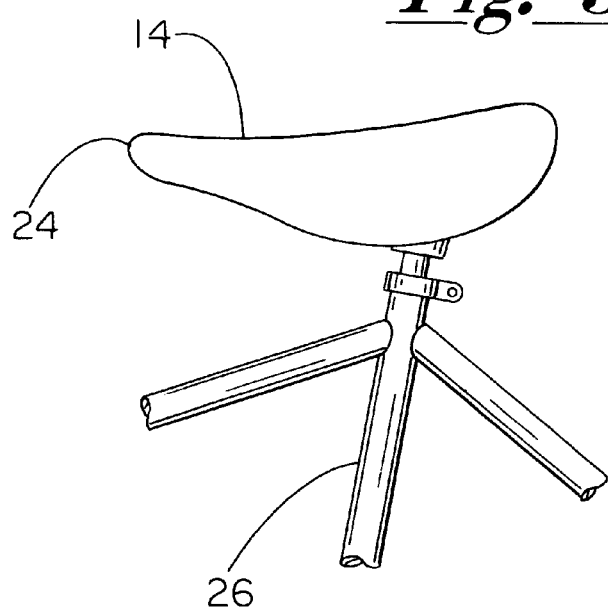
FIG. 5A is a view of a conventional saddle and indicates the type of saddle upon which the saddle cover of FIG. 1A may fit.

As shown in FIG. 1, the present saddle cover is designated by the reference numeral 10. The saddle cover 10 generally includes an envelope 12 formed to cover a conventional saddle 14, shown in FIG. 5A, a pair of rear resilient cushions or cushion portions 16 for the bony portion of the buttocks, a pair of front resilient cushion portions 18 for cradling the male organ, and an integral tip cushion portion 20 joining the cushion portions 18.

In more specificity, the envelope 12 is resilient and takes generally the shape of a conventional saddle, such as saddle 14, when the envelope 12 is off and on the saddle 14 with the exception that when on the saddle 14 the envelope 12 is slightly larger in size since the envelope is being stretched. The envelope 12 is placed on the saddle 14 via an opening 22, shown in FIG. 3A, formed in the envelope 12. Opening 22 is slidingly receives a tip 24 of conventional saddle 14, and the opening 22 expands as the resilient envelope 12 is stretched so as to fully receive the tear drop shaped or generally triangular shaped saddle 14. When the envelope 12 is on the saddle 14, opening 22 surrounds an upright bicycle post 26 or an extension or derivative thereof such as a connection between the bicycle post 26 and the saddle 14.

Figure 5B:
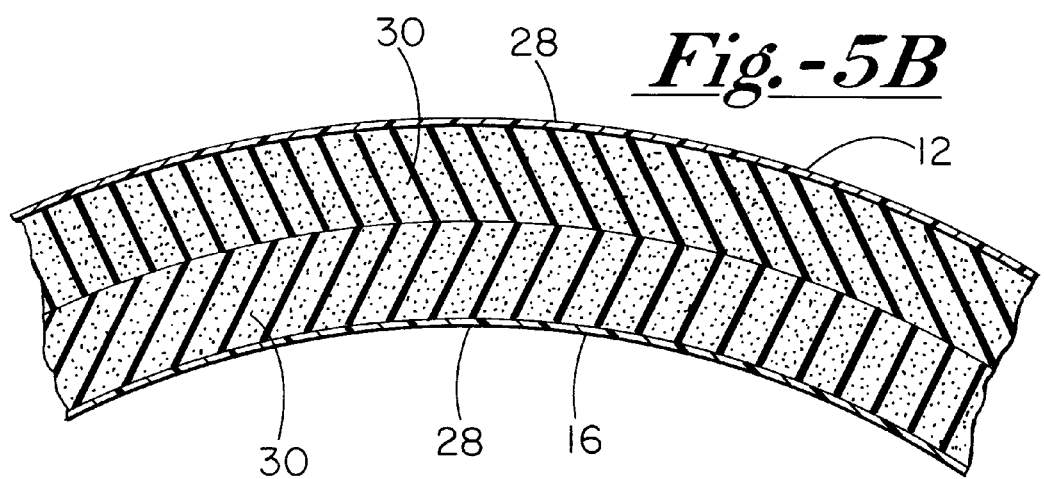
FIG. 5B is a partial section view of the saddle cover of FIG. 1A to show the double layer of thickness for each of the front and rear resilient cushions.

As shown in FIG. 5B, envelope 12 includes a skin layer 28 and an underlying resilient cushioning layer 30. Skin layer 28 is bonded to resilient cushioning layer 30. Envelope 12 is preferably neoprene. Skin 28 may be lycra, polyester or nylon or other stretchable fabric or sheeting. Resilient cushioning layer 30 is preferably a rubber such as polychloroprene and is preferably closed or air celled. Resilient cushioning layer 30 may be large celled or small celled.

As shown in FIG. 3A, envelope 12 is formed from two pieces 32, 34 of a material having the skin layer 28 bonded to the underlying resilient cushioning layer 30. The skin layer 28 of such pieces 32, 34 is sewn together along a stitch line 36, shown in FIGS. 2A, 3A, and 4B. The underlying closed cell layer 30 of such pieces 32, 34 is glued together along a glue line 38, shown in FIG. 3B, or is heat bonded. Stitch lines in the saddle cover 10, such as stitch line 36, may be flatlock stitching or blindstitching. Flatlock stitching is where the two edges are sewn flat, eliminating the raised seam. Blindstitching is water tight and is the most comfortable. Blindstitching is where the two edges are glued and then butted together, followed by stitching that does not penetrate through to the other side of the neoprene. A heat-welded tape can be placed over the seam on the inside to further strengthen the seams.

Envelope 12 is further formed by joining a portion of two edges 40, 42 with stitching via stitch line 44 and by heat welding or gluing along line 46. Edge portions 48 and 50 of edges 40 and 42 are not joined and remain free of the other to give a greater size to opening 22. Stitch line 44 is reinforced via transverse stitch line 52 to minimize the chances of stitch line 44 being split when opening 22 is stretched. It should be noted that edge portions 48 and 50 make contact with each other when the saddle cover 10 is on the saddle 14.

As shown in FIG. 1A, envelope 12 further includes an upper portion 54 that is generally smooth and free of stitching and a lower portion 56 in which opening 22 is formed, as shown in FIG. 3A. As shown in FIG. 1A, upper portion 54 includes a front portion 58, a rear portion 60, tapering side edges 62, a rounded rear edge 64, and a tip 66. When the envelope 12 is on the saddle 14, the envelope 12 has the appearance of a conventional saddle. Cushion portions 16, 18, and 20 are little, if any, noticeable.

Rear resilient cushions or cushion portions 16 are positioned so as to confront the bony portions of the buttocks, i.e., the ischial tuberosity (a protrusion of the pelvic girdle). Rear cushions 16 are glued or heat bonded to an inner surface 68 of the envelope 12 such that the rubber 30 of the cushion 16 confronts the rubber 30 of the envelope 12, as shown in FIG. 5B. Rear cushions 16 are spaced from tapering edges 62, from rear edge 64, from front cushion portions 18, and from each other. As indicated by FIG. 5B, the thickness of cushion 16 is generally the same as the thickness of envelope 12. Each of the cushions 16 is generally egg shaped or elliptical in shape.

Front resilient cushion portions 18 are positioned so as to cradle the male organ, the penis, on and between the portions 18. Cushion portions 18 run rearwardly and frontwardly and are spaced transversely from each other. An elongate cushioned portion 70 of the envelope 12 runs between the cushion portions 18 and the male organ may lie on this elongate portion 70 as well as the elongate portions 18. The rubber portion 30 of the neoprene cushion portion 18 is heat bonded or glued to the inner surface 68 of envelope 12, i.e. to the rubber portion 30 of envelope 12. Elongate cushion portions 18 are generally spaced in from the tapering edges 62. The thickness of elongate cushion portion 18 is generally the same as the thickness of envelope 12.

Integrally with front cushion portions 18 is the tip cushion portion 20. Tip cushion portion 20 meets tapering edges 62 and tapers inwardly itself to tip 66. As shown in FIG. 2A, tip cushion portion 20 also tapers slowly upwardly as it extends forwardly.

It should be noted that the portions of the envelope 12 immediately above cushion portions 16 are relatively raised, that the portions of envelope 12 immediately above elongate front cushion portions 18 are relatively raised, and that the other portions of the envelope 12 on the upper portion 12 are relatively depressed. These relatively depressed regions include the elongate space 70, and a medial space 72 between the front elongate cushion portions 18 and the rear elliptical cushion portions 16. This medial space 72 which is relatively depressed runs between tapering edges 62.

Figure 6A:
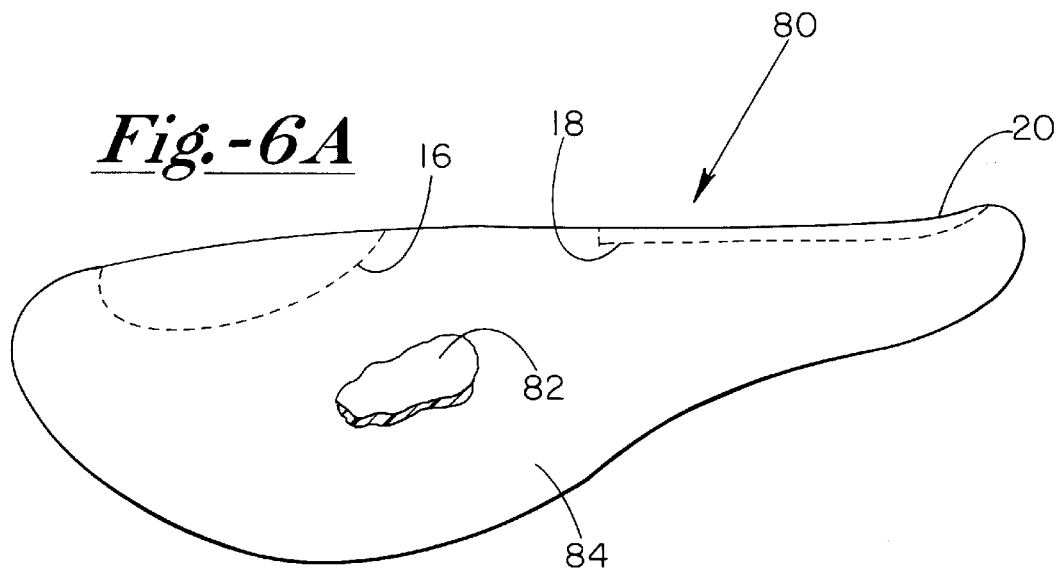
FIG. 6A is top view of an alternate embodiment where the present invention is formed as one piece with a saddle.
Figure 6B:
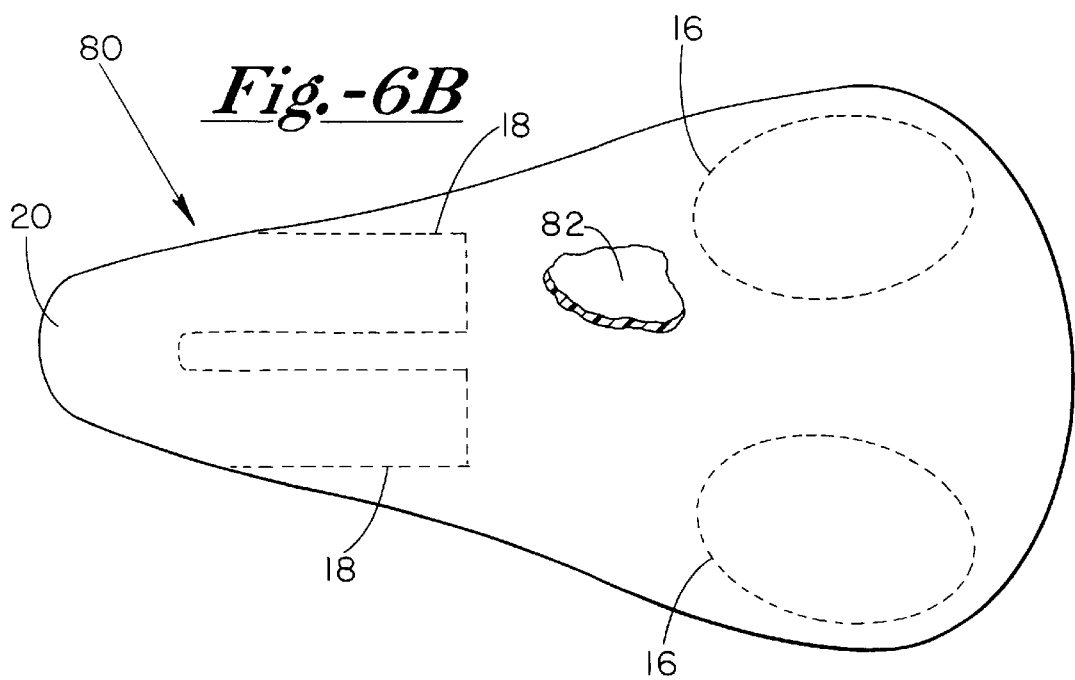
FIG. 6B is a side view of the one piece saddle embodiment of FIG. 6A.

As shown in FIGS. 6A and 6B, an alternate embodiment of the invention includes a saddle 80 having a base 82. In such embodiment, a resilient cushioned covering 84 is bonded, such as by gluing or heat bonding, to the base 82. Covering 84 preferably has the characteristics of envelope 12 and, like envelope 12, is preferably formed of a neoprene material having a polychoroprene rubber base 30 and skin 28 of a fabric such as nylon. Sandwiched between the base 82 and the covering 84 are the rear cushion portions 16 for the bony portions of the buttocks, the front elongate cushion portions 18 for cradling the male organ, and the integral tip cushion portion 20. Base 82 is affixed to a bicycle post such as post 26. As to base 82, the following documents are hereby incorporated by reference in their entireties: the Marchello U.S. Pat. No. 4,451,083 issued May 29, 1984, the Conner, Jr. et al. U.S. Pat. No. 4,842,332 issued Jun. 27, 1989, and the Landi U.S. Pat. No. 5,203,607 issued Apr. 20, 1993.

Besides cradling the male organ, the front elongate cushion portions 18 cushion the pubic tubercle (a portion of the pubic bone) on either side of the pubic symphysis. Though preferred for the male, the saddle cover 10 may be used by the female rider, with the front elongate cushion portions 18 engaging the pubic tubercles and bearing the weight of the female rider, and with the space between the front elongate cushion portions 18 thereby exerting less pressure on the female genital region.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A removable bicycle saddle cover for a bicycle saddle, with the bicycle saddle having a general three-sided shape when viewed from above and being engaged to a bicycle frame portion, comprising, in combination:
   a) a resilient envelope comprising:
      i) the general three-sided shape of the bicycle saddle when off the bicycle saddle;
      ii) the general three-sided shape of the bicycle saddle when on the bicycle saddle;
      iii) a material that is resilient and cushioning;
      iv) an underside having an opening for the bicycle frame portion, with the envelope being engaged to the bicycle saddle via the envelope being stretched to enlarge the opening;

v) a front portion, a rear portion, and an inner surface, with the resilient envelope tapering from the rear portion to the front portion; and vi) a first thickness;

b) with the resilient envelope further comprising:

i) a pair of rear resilient cushion portions engaged to the inner surface of the envelope at the rear portion of the envelope such that a thickness of the envelope and said rear cushion portion is greater than the first thickness, with the rear resilient cushion portions being disposed transversely of each other and being disposed on opposite side halves of said resilient envelope, and with the rear resilient cushion portions being disposed so as to confront bony portions of a buttocks of a rider, c) with the resilient envelope still further comprising:

i) a pair of front resilient cushion portions engaged to the inner surface of the envelope at the front portion of the envelope such that a thickness of the envelope and said front cushion portion is greater than the first thickness. with the front resilient cushion portions being disposed parallel to each other and being disposed on opposite side halves of said resilient envelope, with the front resilient cushion portions being elongate and running forwardly and rearwardly such that the front resilient cushion portions are adapted for supporting one of a male organ and pubic bone, with said pair of front resilient cushion portions forming an elongate space therebetween at an uppermost elevation of said resilient envelope when said resilient envelope is on said bicycle saddle, and with said elongate space running forwardly and rearwardly.

2. The removable bicycle saddle cover according to claim 1 wherein the envelope includes a medial portion between the rear resilient cushion portions, with the medial portion having a thickness of about the first thickness.

3. The removable bicycle saddle cover according to claim 1 wherein the rear resilient cushion portions are disposed so as to confront a bony portion of the buttocks selected from the group consisting of a bony protrusion of a pelvic girdle and a bony protrusion of an ischial tuberosity.

4. The removable bicycle saddle cover according to claim 1 wherein the saddle cover includes an exterior upper surface defined by side edge portions and end edge portions, with the exterior upper surface being generally smooth and free of stitching.

5. The removable bicycle saddle cover according to claim 1 wherein each of the rear resilient cushion portions comprises generally an elliptical shape.

6. A removable bicycle saddle cover for a bicycle saddle, with the bicycle saddle having a general three-sided shape when viewed from above and being engaged to a bicycle frame portion, comprising, in combination:

a) a resilient envelope comprising:

i) the general three-sided shape of the bicycle saddle when off the bicycle saddle;

ii) the general three-sided shape of the bicycle saddle when on the bicycle saddle;

iii) a material that is resilient and cushioning;

iv) an underside having an opening for the bicycle frame portion, with the envelope being engaged to the bicycle saddle via the envelope being stretched to enlarge the opening;

v) a front portion, a rear portion, and an inner surface, with the resilient envelope tapering from the rear portion to the front portion; and vi) a first thickness; and b) with the resilient envelope further comprising:

i) a pair of resilient cushion portions engaged to the inner surface of the envelope at the front portion of the envelope such that a thickness of the envelope and said cushion portion is greater than the first thickness, with the resilient cushion portions being disposed transversely of each other, with the resilient cushion portions being elongate and running generally forwardly and rearwardly such that the elongate resilient cushion portions are adapted for cradling a male organ in an aerotuck position; and ii) wherein the front portion of the envelope includes a tip portion, and wherein the elongate resilient portions run into the tip portion and toward each other where the elongate resilient portions are integrally joined.

7. The removable bicycle saddle cover according to claim 6 wherein the envelope includes a medial portion between the elongate resilient cushion portions, with the medial portion having a thickness of about the first thickness.

8. The removable bicycle saddle cover according to claim 7 wherein the saddle cover includes an exterior upper surface defined by side edge portions and end edge portions, with the exterior upper surface being generally smooth and free of stitching.

9. The removable bicycle saddle cover according to claim 6 wherein the elongate resilient portions taper in thickness where the elongate resilient portions run toward each other and are integrally joined.

10. A removable bicycle saddle cover for a bicycle saddle, comprising, in combination:

a) a resilient envelope comprising:

i) a material that is resilient and cushioning;

ii) an underside having an opening for the bicycle frame portion, with the envelope being engaged to the bicycle saddle via the envelope being stretched to enlarge the opening;

iii) a front portion, a rear portion, and an inner surface, with the resilient envelope tapering from the rear portion to the front portion; and iv) a first thickness; and b) with the resilient envelope further comprising:

i) a pair of rear resilient cushion portions engaged to the inner surface of the envelope at the rear portion of the envelope such that a thickness of the envelope and said rear resilient cushion portion is greater than the first thickness, with the rear resilient cushion portions being disposed transversely of each other and being disposed on opposite side halves of the envelope, and with the rear resilient cushion portions being disposed so as to confront bony portions of a buttocks of a rider; and ii) a pair of front resilient cushion portions engaged to the inner surface of the envelope at the front portion of the envelope such that a thickness of the envelope and said front resilient cushion portion is greater than the first thickness, with the front resilient cushion portions being disposed parallel to each other and being disposed on opposite side halves of said resilient envelope, with the front resilient cushion portions being elongate and running forwardly and rearwardly such that the elongate resilient cushion portions are adapted for supporting one of the male organ and pubic bone, with said pair of front resilient cushion portions forming an elongate space therebetween at an uppermost elevation of said resilient envelope when said resilient envelope is on said bicycle saddle, and with said elongate space running forwardly and rearwardly.

11. The removable bicycle saddle cover according to claim 10 wherein the envelope includes a medial portion between the rear resilient cushion portions and the front resilient cushion portions, with the medial portion having a thickness of about the first thickness to provide a relative depression between the front and rear resilient cushion portions.

12. A bicycle saddle, comprising, in combination:
   a) a base, with the base comprising a rear portion and a front portion, with the base tapering from the rear portion to the front portion, with the base further comprising an upper surface portion;
   b) a pair of rear relatively raised resilient cushion portions on the base at the rear portion of the base, with the rear relatively raised resilient cushion portions being disposed transversely of each other and being disposed on opposite side halves of the base, and with the rear relatively raised resilient cushion portions being disposed so as to confront bony portions of a buttocks of a rider; and
   c) a pair of front relatively raised resilient cushion portions on the base at a tip portion of the front portion of the base, with the front relatively raised resilient cushion portions being disposed parallel to each other and being disposed on opposite side halves of said base, with the front relatively raised resilient cushion portions being elongate and running forwardly and rearwardly such that the front relatively raised resilient cushion portions are adapted for cradling a male organ in an aerotuck position, with said pair of front relatively raised resilient cushion portions forming an elongate space therebetween at an uppermost elevation of said base, and with said elongate space running forwardly and rearwardly.

13. The bicycle saddle according to claim 12 and further comprising a resilient and cushioning outer skin having a first thickness and being engaged at least to the upper surface portion of the base from the rear portion to the front portion, with the front and rear relatively raised resilient cushion portions being disposed between the outer skin and the base.

14. A bicycle saddle, comprising, in combination:
   a) a base, with the base comprising a rear portion and a front portion, with the base tapering from the rear portion to the front portion, with the base further comprising an upper surface portion;
   b) a pair of relatively raised resilient cushion portions on the base at the front portion of the base, with the relatively raised resilient cushion portions being disposed transversely of each other, and with the relatively raised resilient cushion portions being elongate and running forwardly and rearwardly such that the elongate resilient cushion portions are adapted for cradling a male organ in an aerotuck position and so as to form an elongate space therebetween running forwardly and rearwardly at an uppermost elevation of the base; and
   c) wherein the front portion of the base includes a tip portion, and wherein the relatively raised resilient portions run into the tip portion and toward each other where the elongate resilient portions are integrally joined so as to block off a front end of the elongate space.

15. The bicycle saddle according to claim 14 and further comprising a resilient and cushioning outer skin having a first thickness and being engaged at least to the upper surface portion of the base from the rear portion to the front portion, with the relatively raised resilient cushion portions being disposed between the outer skin and the base.

16. A bicycle saddle, comprising, in combination:
   a) a base, with the base comprising a rear portion and a front portion, with the base tapering from the rear portion to the front portion, with the base further comprising an upper surface portion;
   b) a pair of rear relatively raised resilient cushion portions on the base at the rear portion of the base, with the rear relatively raised resilient cushion portions being disposed transversely of each other and being disposed on opposite side halves of the base, and with the rear relatively raised resilient cushion portions being disposed so as to confront bony portions of a buttocks of a rider; and
   b) a pair of front relatively raised resilient cushion portions on the base at a tip portion of the front portion of the base, with the front relatively raised resilient cushion portions being disposed parallel to each other and being disposed on opposite side halves of the base, and with the front relatively raised resilient cushion portions being elongate and running forwardly and rearwardly such that the elongate resilient cushion portions are adapted for supporting one of the male organ and pubic bone, with said pair of front resilient cushion portions forming an elongate space therebetween at an uppermost elevation of said base, and with said elongate space running forwardly and rearwardly.

17. The bicycle saddle according to claim 16 wherein the base includes a medial portion between the rear relatively raised resilient cushion portions and the front relatively raised resilient cushion portions, with the medial portion being relatively depressed relative to the front and rear relatively raised resilient cushion portions.

* * * * *